United States Patent
Gilat

(10) Patent No.: US 8,908,710 B2
(45) Date of Patent: Dec. 9, 2014

(54) ROUTING PACKETS THROUGH EXTERNAL MEMORY

(75) Inventor: Saar Gilat, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 178 days.

(21) Appl. No.: 13/411,692

(22) Filed: Mar. 5, 2012

(65) Prior Publication Data

US 2013/0230054 A1 Sep. 5, 2013

(51) Int. Cl.
*H04L 12/70* (2013.01)

(52) U.S. Cl.
USPC .......................................... 370/428; 370/412

(58) Field of Classification Search
CPC ............ H04L 2012/54; H04L 2012/56; H04L 2012/5697; H04L 2012/5698
USPC .......................... 370/254–350; 709/201–213
See application file for complete search history.

(56) References Cited

U.S. PATENT DOCUMENTS

| 8,570,866 | B2 * | 10/2013 | Buckman et al. | 370/230 |
| 2008/0183907 | A1 * | 7/2008 | Thudt | 710/11 |
| 2012/0240185 | A1 * | 9/2012 | Kapoor et al. | 726/1 |

* cited by examiner

*Primary Examiner* — Ayaz Sheikh
*Assistant Examiner* — Debebe Asefa
(74) *Attorney, Agent, or Firm* — Oblon, Spivak, McClelland, Maier & Neustadt, L.L.P.

(57) ABSTRACT

The disclosed embodiments provide a way to reduce dropped packets by conditionally routing data packets through the external memory prior to classification. By utilizing the external memory (or off-chip memory) to temporarily store the incoming data packets when the data rate is extremely high, the disclosed embodiments largely eliminate overloading of the on-chip memory, thereby reducing dropped data packets.

17 Claims, 1 Drawing Sheet

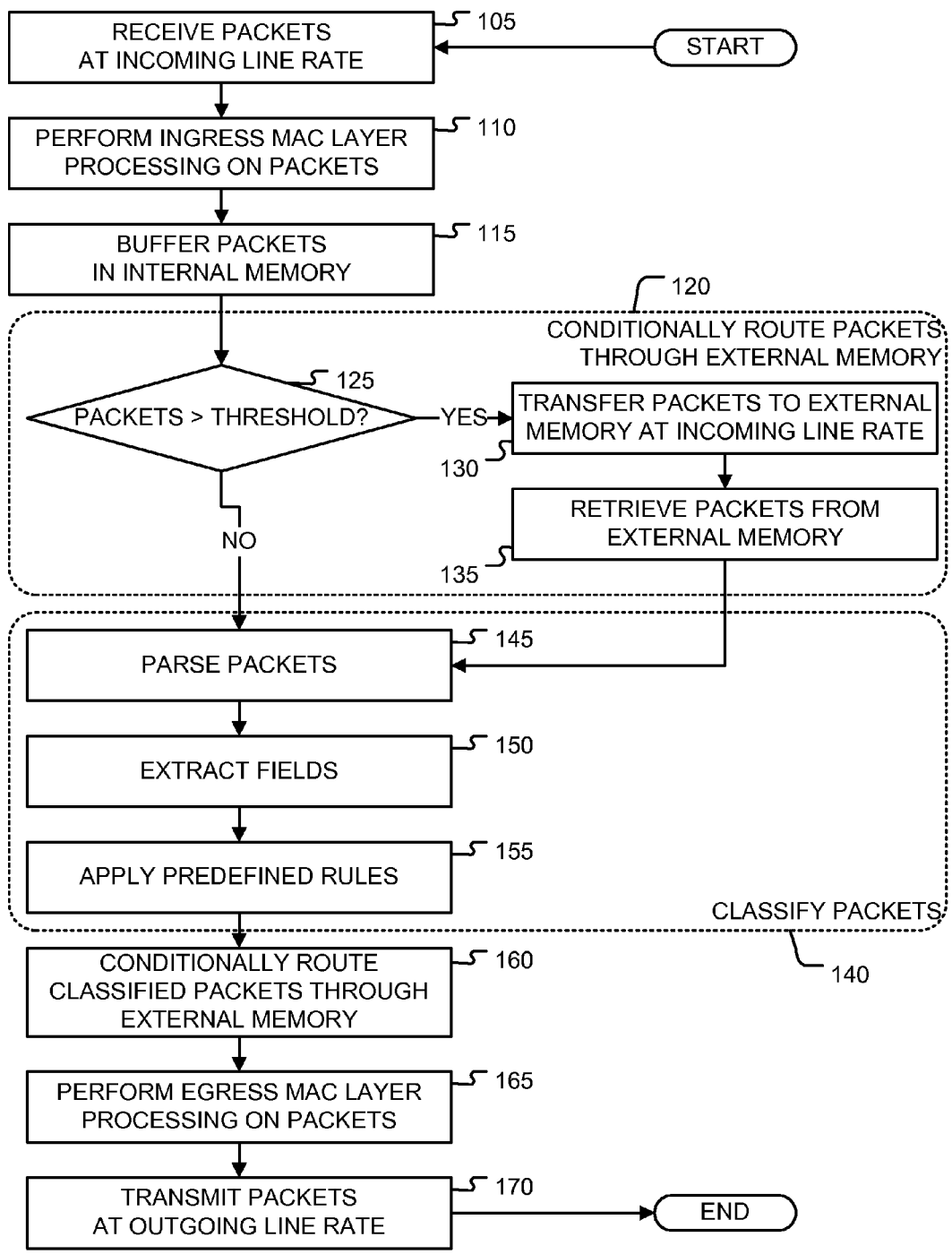

ROUTING PACKETS THROUGH EXTERNAL MEMORY

BACKGROUND

1. Field of the Disclosure

The present disclosure relates generally to packet-switching networks and, more particularly, to systems and methods for routing packets through external memory.

2. Description of Related Art

Sporadically, switches in packet-switching networks experience instantaneous bursts of unusually-high data traffic. During these high-traffic bursts, the switches can drop data packets. These dropped packets can cause problems. As such, there is an ongoing effort to reduce dropped packets.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a flowchart showing a method of routing packets through external memory.

DETAILED DESCRIPTION OF THE EMBODIMENTS

Switches in packet-switching networks route data packets from a source to a destination. As data packets travel through the network, they can sometimes pass through multiple switches, each of which receive the packets, process the packets, and then forward them onto the final destination or to another switch. These switches include processors that are responsible for processing the packets, and the processors include internal memories (also known as on-chip memories) that allow the processor to temporarily store the data packets as those packets are processed. Those on-chip memories are usually small and fast. This is because larger on-chip memories are expensive and consume more power than their smaller counterparts. In order to compensate for small internal memories, some processors also include external memories (also known as off-chip memories), which allow the processor to off-load some of the on-chip memory functions to the off-chip memory. Unlike on-chip memories, the off-chip memories are more cost-effective and lower-power devices.

The switches typically process the packets in multiple steps, including: receiving the packets, media access control (MAC) layer processing of the packets, on-chip buffering of the packets, classifying the packets, performing egress MAC layer processing on the packets, and eventually transmitting the packets. For packet processors with external memories, the processing of the packets can include an optional step in which the packets are routed through the external memory after classification. This type of after-classification off-loading helps to prevent overloading of the smaller internal memory, which is particularly useful when the switches experience bursts of high-traffic data congesting to a single port or a single queue on a port. During those high-traffic periods, data packets can be dropped if the on-chip memory becomes overloaded. By allowing the processor to off-load some of the packet buffering to off-chip memory, the packet processor effectively reduces the number of dropped packets, and is able to cope with longer burst periods.

Unfortunately, this after-classification off-loading requires the processor to classify the packets at a rate that is sufficiently fast to prevent overloading of the internal memory with pre-classified packets. This is because a slower classification results in accumulation of pre-classified data packets in the internal memory. Thus, since the incoming line rate far exceeds the classification rate, during these bursty periods, the incoming data far exceeds the capacity of the internal memory. Hence, even with an external memory, data packets can be dropped prior to classification. This is problematic because the packets that are dropped prior to classification may be high-priority packets. In other words, pre-classification, the data packets are dropped indiscriminately, irrespective of whether the dropped packets are high-priority packets or low-priority packets.

One way to ameliorate this problem is to engineer a processor's classification capabilities so that the rate at which the processor classifies the packets exceeds the incoming packet rate. However, this results in over-engineering the processor, which results in a processor that consumes more power and is more costly to fabricate.

Another alternative is to provide limited classification mechanisms prior to full classification. However, as the phrase implies, this method is limited. The reason being that usually only basic fields can be used for the limited classification, thereby still resulting in indiscriminate dropping of both high-priority and low-priority packets.

The disclosed embodiments provide a way to reduce dropped packets by conditionally routing data packets through the external memory prior to classification. By utilizing the external memory (or off-chip memory) to temporarily store the incoming data packets when the data rate is extremely high, the disclosed embodiments largely eliminate overloading of the on-chip memory, thereby reducing dropped data packets.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a flowchart showing one embodiment of a method of routing packets through external memory. As shown in FIG. 1, this embodiment starts when the switch receives 105 packets at an incoming line rate. The switch (or more accurately the processing elements within the switch) then performs 110 ingress media access control (MAC) layer processing on the packets. The packets are then buffered 115 in internal memory (or on-chip memory). The processor then conditionally routes 120 the packets through external memory (or off-chip memory). In other words, the routing 120 of the packets is optional. As such, the conditional routing 120 can be seen as a process that first determines 125 whether or not the packets in the internal memory exceed a predefined threshold capacity. Stated differently, the switch determines whether the incoming line rate is faster than the rate at which the packets clear the on-chip memory, namely the rate at which they are processed.

If the packets do not exceed a predefined threshold (or if the packets are not accumulating too quickly in the internal memory), then the switch proceeds directly to classifying 140 the packets. If, on the other hand, the packets in the internal memory exceed the predefined threshold (or if the packets are accumulating too quickly in the internal memory), then the switch transfers 130 the packets to the external memory. This transfer is done at the incoming line rate so that the internal memory is not overloaded. Thereafter, the packets are retrieved 135 from the external memory at a rate that is slower than the incoming line rate, preferably at a rate that matches the packet classification rate. Thus, as one can see, packet retrieval from the external memory need not be as fast as the writing of the packets to the external memory. The retrieved packets are then classified 140. In one embodiment, the packets are routed 120 to external memory until all of the packets have cleared from external memory. In effect, clearing of the external memory correlates with the contents of the internal memory going below the threshold value.

For the embodiment of FIG. 1, the classification 140 process is a multi-step process where the switch first parses 145 the packets. Thereafter, the switch extracts 150 fields from the packets and applies 155 predefined rules that are set up in one or more tables.

After classification 140, the classified packets are conditionally (or optionally) routed 160 through external memory. Again, depending on various factors, the off-load to external memory can be bypassed in some embodiments. Since those factors are known to those having skill in the art, that description is omitted here.

Eventually, the switch performs 165 egress MAC-layer processing on the packets, and transmits 170 the packets at an outgoing line rate.

As one can see from the embodiment of FIG. 1, allowing for data packet off-loading prior to classification reduces the number of dropped packets. Additionally, using the off-chip memory provides a lower-cost, lower-power-consumption alternative to ameliorate bursts of high data traffic.

The pre-classification off-loading schemes described in the embodiment of FIG. 1 poses particular challenges, such as, for example, moving the data packets back-and-forth from memory twice. Additionally, those having skill in the art often presume that the processing within the switch is required to occur at line rates. However, the method of FIG. 1 takes a contrary position in that it allows for processing to occur at a slower rate, since high-traffic bursts are somewhat indicative of a worst-case scenario and are not representative of average line usage.

The processor (or processing elements) may be implemented in hardware, software, firmware, or a combination thereof. In the preferred embodiment(s), the processor (or processing elements) is implemented in hardware using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In an alternative embodiment, the processor (or processing elements) is implemented in software or firmware that is stored in a memory and that is executed by a suitable instruction execution system.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order (unless otherwise indicated) from that shown or discussed, including substantially concurrently or in reverse order, depending on the functionality involved, as would be understood by those reasonably skilled in the art of the present disclosure.

The processing function of the switch, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the disclosure as described may be made. For example, while the specific embodiments teach a method for processing data packets in a packet-switching network, it should be appreciated that a similar method can be applied to other environments that exhibit high input rates and bursts of high-traffic data. Also, while the disclosed embodiments show off-loading and retrieving of the entire packets, it should be appreciated that the entire packet can be off-loaded and only the portions of the data packet that are required for classification retrieved, thereby reducing the amount of data transferred to and from the off-chip memory. All such changes, modifications, and alterations should therefore be seen as within the scope of the disclosure.

What is claimed is:

1. A method for routing packets in a switch that includes an internal memory and an external memory, the method comprising:
 receiving the packets at an incoming line rate;
 buffering the packets in the internal memory;
 determining whether the buffered packets exceed a predefined threshold capacity in the internal memory, wherein
  if the buffered packets exceed the predefined threshold capacity, then transfer the packets to the external memory at the incoming line rate, retrieve the transferred packets from the external memory at a rate that is slower than the incoming line rate, and classify the packets; and
  if the buffered packets do not exceed the predefined threshold capacity, then perform the classification of the packets; and
 transmitting the classified packets at an outgoing line rate, wherein
 prior to the classification, the buffered packets are transferred to the external memory only if the buffered packets exceed the predefined threshold capacity.

2. The method according to claim 1, further comprising:
performing ingress media access control (MAC) layer processing on the received packets.

3. The method according to claim 1, wherein the classifying further includes:
parsing the packets;
extracting fields from the parsed packets; and
applying predefined rules based on the extracted fields.

4. The method according to claim 1, further comprising:
conditionally routing the classified packets through the external memory.

5. The method according to claim 4, further comprising:
performing egress MAC-layer processing on the classified packets.

6. The method according to claim 1, wherein the transferring of the packets to the external memory eliminates overloading of the internal memory, thereby reducing dropped packets in the internal memory.

7. The method according to claim 1, wherein the predefined threshold capacity in the internal memory is based on a rate at which the packets are processed.

8. The method according to claim 1, wherein the rate of the retrieving of the transferred packets corresponds to a rate of the classifying of the packets.

9. A switch in a packet-switching network, the switch comprising:
an internal memory;
an external memory; and
circuitry configured to:
receive packets at an incoming line rate;
buffer the packets in the internal memory;
determine whether the buffered packets exceed a predefined threshold capacity in the internal memory, wherein
if the buffered packets exceed the predefined threshold capacity, then transfer the packets to the external memory at the incoming line rate, retrieve the transferred packets from the external memory at a rate that is slower than the incoming line rate, and classify the packets; and
if the buffered packets do not exceed the predefined threshold capacity, then perform the classification of the packets; and
transmit the classified packets at an outgoing line rate, wherein
prior to the classification, the buffered packets are transferred to the external memory only if the buffered packets exceed the predefined threshold capacity.

10. The switch according to claim 9, wherein the circuitry is further configured to:
perform ingress media access control (MAC) layer processing on the received packets.

11. The switch according to claim 9, wherein the circuitry is further configured to:
parse the packets;
extract fields from the parsed packets; and
apply predefined rules based on the extracted fields.

12. The switch according to claim 9, wherein the circuitry is further configured to:
conditionally route the classified packets through the external memory.

13. The switch according to claim 12, wherein the circuitry is further configured to:
perform egress MAC-layer processing on the classified packets.

14. The switch according to claim 9, wherein the transferring of the packets to the external memory eliminates overloading of the internal memory, thereby reducing dropped packets in the internal memory.

15. The switch according to claim 9, wherein the predefined threshold capacity in the internal memory is based on a rate at which the packets are processed.

16. The switch according to claim 9, wherein the rate of the retrieval of the transferred packets corresponds to a rate of the packet classification.

17. A system having a plurality of switches for routing packets, each of the switches comprising:
an internal memory;
an external memory; and
circuitry configured to:
receive the packets at an incoming line rate;
buffer the packets in the internal memory;
determine whether the buffered packets exceed a predefined threshold capacity in the internal memory, wherein
if the buffered packets exceed the predefined threshold capacity, then transfer the packets to the external memory at the incoming line rate, retrieve the transferred packets from the external memory at a rate that is slower than the incoming line rate, and classify the packets; and
if the buffered packets do not exceed the predefined threshold capacity, then perform the classification of the packets; and
transmit the classified packets at an outgoing line rate, wherein
prior to the classification, the buffered packets are transferred to the external memory only if the buffered packets exceed the predefined threshold capacity.

* * * * *